United States Patent
Marson et al.

(10) Patent No.: US 12,326,823 B2
(45) Date of Patent: Jun. 10, 2025

(54) APPLICATION AUTHENTICATION AND DATA ENCRYPTION WITHOUT STORED PRE-SHARED KEYS

(71) Applicant: Cryptography Research, Inc., San Jose, CA (US)

(72) Inventors: Mark E. Marson, Carlsbad, CA (US); Scott Best, Palo Alto, CA (US); Winthrop Wu, Pleasanton, CA (US); Matthew Evan Orzen, San Francisco, CA (US); Helena Handschuh, Palo Alto, CA (US)

(73) Assignee: Cryptography Research, Inc., San Jose, CA (US)

( * ) Notice: Subject to any disclaimer, the term of this patent is extended or adjusted under 35 U.S.C. 154(b) by 473 days.

(21) Appl. No.: 16/935,925

(22) Filed: Jul. 22, 2020

(65) Prior Publication Data
US 2021/0056053 A1      Feb. 25, 2021

Related U.S. Application Data

(60) Provisional application No. 62/888,903, filed on Aug. 19, 2019.

(51) Int. Cl.
| | |
|---|---|
| *G06F 3/00* | (2006.01) |
| *G06F 12/00* | (2006.01) |
| *G06F 13/16* | (2006.01) |
| *G06F 21/60* | (2013.01) |
| *G06F 21/64* | (2013.01) |
| *G06F 21/72* | (2013.01) |

(52) U.S. Cl.
CPC ........ *G06F 13/1668* (2013.01); *G06F 21/602* (2013.01); *G06F 21/64* (2013.01); *G06F 21/72* (2013.01)

(58) Field of Classification Search
CPC .... G06F 13/1668; G06F 21/602; G06F 21/64; G06F 21/72
USPC ........................................... 711/154
See application file for complete search history.

(56) References Cited

U.S. PATENT DOCUMENTS

| | | | | |
|---|---|---|---|---|
| 5,418,854 | A | * | 5/1995 | Kaufman ................ G06F 21/85 380/30 |
| 5,651,069 | A | * | 7/1997 | Rogaway .............. H04L 9/3242 713/181 |

(Continued)

OTHER PUBLICATIONS

Sreekanth Malladi et al. "On Preventing Replay Attacks on Security Protocols" International Conference on Security and Management (2002), 7 pages.

*Primary Examiner* — Sheng Jen Tsai
(74) *Attorney, Agent, or Firm* — Lowenstein Sandler LLP

(57) ABSTRACT

Described herein are technologies for application authentication and/or data encryption without stored pre-shared keys. In one resource controller, a processing device receives an application identifier (ID) from the application. The processing device provides a current nonce responsive to the application ID and provides the application access to the system resource responsive to determining that a hash of a current key received from the application equals a current tag. The current key is generated by the application based on code of the application and the current nonce. The current tag was previously provided from the application to the resource controller. The current tag can also be hashed by the application using the current key.

20 Claims, 9 Drawing Sheets

(56) References Cited

U.S. PATENT DOCUMENTS

| | | | | |
|---|---|---|---|---|
| 5,657,390 | A * | 8/1997 | Elgamal | H04L 9/40 713/151 |
| 7,738,454 | B1 * | 6/2010 | Panwar | H04L 49/1515 711/216 |
| 7,827,218 | B1 * | 11/2010 | Mittal | G06F 16/2228 707/899 |
| 8,745,390 | B1 * | 6/2014 | Atwood | H04L 9/0825 713/169 |
| 9,369,282 | B2 * | 6/2016 | Pal | H04W 12/069 |
| 9,614,670 | B1 * | 4/2017 | Ghetti | H04L 63/065 |
| 9,887,975 | B1 * | 2/2018 | Gifford | H04W 12/0431 |
| 10,243,990 | B1 * | 3/2019 | Chen | G06F 21/57 |
| 10,671,375 | B1 * | 6/2020 | Koeppel | H04W 12/30 |
| 10,855,440 | B1 * | 12/2020 | Alwen | H04L 9/0894 |
| 11,263,622 | B2 * | 3/2022 | Jimenez-Delgado | G06F 16/1837 |
| 2005/0157880 | A1 * | 7/2005 | Kurn | H04L 63/10 380/279 |
| 2005/0257074 | A1 * | 11/2005 | Alkove | G11B 20/00086 713/193 |
| 2007/0100768 | A1 * | 5/2007 | Boccon-Gibod | G06Q 20/202 705/59 |
| 2007/0101412 | A1 * | 5/2007 | Yang | G06F 21/305 726/5 |
| 2007/0185814 | A1 * | 8/2007 | Boccon-Gibod | H04L 9/3242 705/51 |
| 2007/0204078 | A1 * | 8/2007 | Boccon-Gibod | G06F 21/64 710/54 |
| 2008/0301435 | A1 * | 12/2008 | Simon | H04L 9/3226 713/155 |
| 2010/0161999 | A1 * | 6/2010 | Poovendran | H04L 9/3236 713/189 |
| 2010/0211790 | A1 * | 8/2010 | Zhang | H04L 9/321 713/168 |
| 2010/0217997 | A1 * | 8/2010 | Chai | H04L 9/3236 713/168 |
| 2012/0011553 | A1 * | 1/2012 | Maddali | H04N 21/4788 725/106 |
| 2012/0011558 | A1 * | 1/2012 | Maddali | G06Q 30/00 725/131 |
| 2012/0036543 | A1 * | 2/2012 | George | H04N 21/4396 725/106 |
| 2012/0036549 | A1 * | 2/2012 | Patel | H04N 21/42204 455/556.1 |
| 2012/0144457 | A1 * | 6/2012 | Counterman | H04L 9/3247 726/5 |
| 2012/0162537 | A1 * | 6/2012 | Maddali | H04N 21/43615 348/734 |
| 2013/0198294 | A1 * | 8/2013 | Gallagher | H04L 63/0807 709/206 |
| 2013/0230173 | A1 * | 9/2013 | Hori | H04L 9/0819 380/279 |
| 2014/0189359 | A1 * | 7/2014 | Marien | H04L 9/3228 713/172 |
| 2014/0298420 | A1 * | 10/2014 | Barton | H04L 63/102 726/4 |
| 2015/0039890 | A1 * | 2/2015 | Khosravi | H04L 63/061 713/171 |
| 2015/0229475 | A1 * | 8/2015 | Benoit | H04W 12/069 713/168 |
| 2015/0288704 | A1 * | 10/2015 | Huang | H04L 63/08 726/4 |
| 2015/0302109 | A1 * | 10/2015 | Oh | G06F 40/134 715/202 |
| 2015/0302448 | A1 * | 10/2015 | Oh | G06Q 30/02 705/14.19 |
| 2015/0350179 | A1 * | 12/2015 | Kobayashi | H04L 63/10 726/4 |
| 2015/0381621 | A1 * | 12/2015 | Innes | H04W 12/069 726/7 |
| 2016/0092124 | A1 * | 3/2016 | Cowling | G06F 3/0688 711/103 |
| 2016/0092125 | A1 * | 3/2016 | Cowling | G06F 16/13 711/103 |
| 2016/0092491 | A1 * | 3/2016 | Cowling | G06F 16/2365 707/624 |
| 2016/0110109 | A1 * | 4/2016 | Cowling | G06F 3/065 711/161 |
| 2016/0112293 | A1 * | 4/2016 | Cowling | H04L 67/1097 709/224 |
| 2016/0139980 | A1 * | 5/2016 | Cowling | G06F 11/1048 714/763 |
| 2016/0140201 | A1 * | 5/2016 | Cowling | G06F 11/14 707/614 |
| 2016/0147569 | A1 * | 5/2016 | Cowling | G06F 16/22 718/104 |
| 2016/0350421 | A1 * | 12/2016 | Multerer | G06F 16/93 |
| 2017/0019423 | A1 * | 1/2017 | Kotwal | H04L 9/32 |
| 2017/0171174 | A1 * | 6/2017 | Campagna | H04L 63/062 |
| 2017/0171219 | A1 * | 6/2017 | Campagna | H04L 9/0841 |
| 2017/0195121 | A1 * | 7/2017 | Frei | H04L 9/0825 |
| 2017/0300592 | A1 * | 10/2017 | Breslow | G06F 16/9014 |
| 2017/0346851 | A1 * | 11/2017 | Drake | H04L 9/0838 |
| 2018/0167208 | A1 * | 6/2018 | Le Saint | H04L 9/3265 |
| 2018/0248694 | A1 * | 8/2018 | Benoit | H04L 63/061 |
| 2018/0285474 | A1 * | 10/2018 | Oh | G06Q 30/02 |
| 2018/0337782 | A1 * | 11/2018 | Wu | H04L 9/32 |
| 2018/0341596 | A1 * | 11/2018 | Teotia | G06F 12/1018 |
| 2018/0341653 | A1 * | 11/2018 | Teotia | G06F 15/17331 |
| 2019/0044740 | A1 * | 2/2019 | Smith | H04W 12/009 |
| 2019/0068591 | A1 * | 2/2019 | Zhang | H04L 9/0825 |
| 2019/0089532 | A1 * | 3/2019 | Lambert | H04L 63/0853 |
| 2019/0140832 | A1 * | 5/2019 | Leavy | H04L 9/3247 |
| 2019/0164156 | A1 * | 5/2019 | Lindemann | G06Q 20/3829 |
| 2019/0222424 | A1 * | 7/2019 | Lindemann | H04L 9/3297 |
| 2019/0278849 | A1 * | 9/2019 | Chandramouli | G06F 9/526 |
| 2019/0294836 | A1 * | 9/2019 | Hegde | H04L 9/0643 |
| 2019/0363886 | A1 * | 11/2019 | Atwood | H04W 12/71 |
| 2020/0004695 | A1 * | 1/2020 | Anderson | G06F 16/137 |
| 2020/0005285 | A1 * | 1/2020 | Jimenez-Delgado | H04L 9/3239 |
| 2020/0084027 | A1 | 3/2020 | Duchon | G06F 21/602 |
| 2020/0159840 | A1 | 5/2020 | Beckman | H04L 69/04 |
| 2020/0159859 | A1 | 5/2020 | Beckman | G06F 3/067 |
| 2020/0162100 | A1 | 5/2020 | Beckman | G06F 12/0815 |
| 2020/0162101 | A1 | 5/2020 | Beckman | G06F 3/0613 |
| 2020/0162584 | A1 | 5/2020 | Beckman | H04L 47/27 |
| 2020/0177563 | A1 * | 6/2020 | Huapaya | H04L 63/0435 |
| 2020/0213091 | A1 * | 7/2020 | Mai | G06F 12/1408 |
| 2020/0213111 | A1 * | 7/2020 | Leavy | H04L 9/3242 |
| 2020/0259640 | A1 * | 8/2020 | Leavy | H04L 9/0841 |
| 2020/0313910 | A1 * | 10/2020 | Lindemann | H04L 9/3247 |
| 2020/0412556 | A1 * | 12/2020 | Yoon | H04L 63/0876 |

\* cited by examiner

APPLICATION AUTHENTICATION AND DATA ENCRYPTION WITHOUT STORED PRE-SHARED KEYS

RELATED APPLICATIONS

This application claims the benefit of U.S. Provisional Application No. 62/888,903, filed Aug. 19, 2019, the entire contents of which are incorporated by reference.

BACKGROUND

In some computer systems, a system resource controller can be used to control access to system resources. For example, a computer system, having non-volatile memory (NVM) device(s), can control access using an NVM controller. To restrict access to the NVM device(s), the NVM controller can require that an application authenticate itself with the NVM controller to gain access (e.g., read data from the NVM device(s) and/or write data to the NVM device(s)). In some instances, in order for an application to authenticate itself with the NVM controller, the application and NVM controller exchange and store a pre-shared secret (e.g., pre-shared key). After the both the application and the NVM controller store the pre-shared key, the application can use the pre-shared key to authenticate itself with the NVM controller. The application and NVM controller can also exchange and store pre-shared encryption keys to encrypt data being written to or read from the NVM device(s). In computer systems with constrained resources, such as embedded processors or Internet of Things (IoT) device, it can be difficult to store and protect pre-shared secrets for authenticating applications with the resource controller.

BRIEF DESCRIPTION OF THE DRAWINGS

The present disclosure is illustrated by way of example, and not by way of limitation, in the figures of the accompanying drawings.

DETAILED DESCRIPTION

Figure 1:
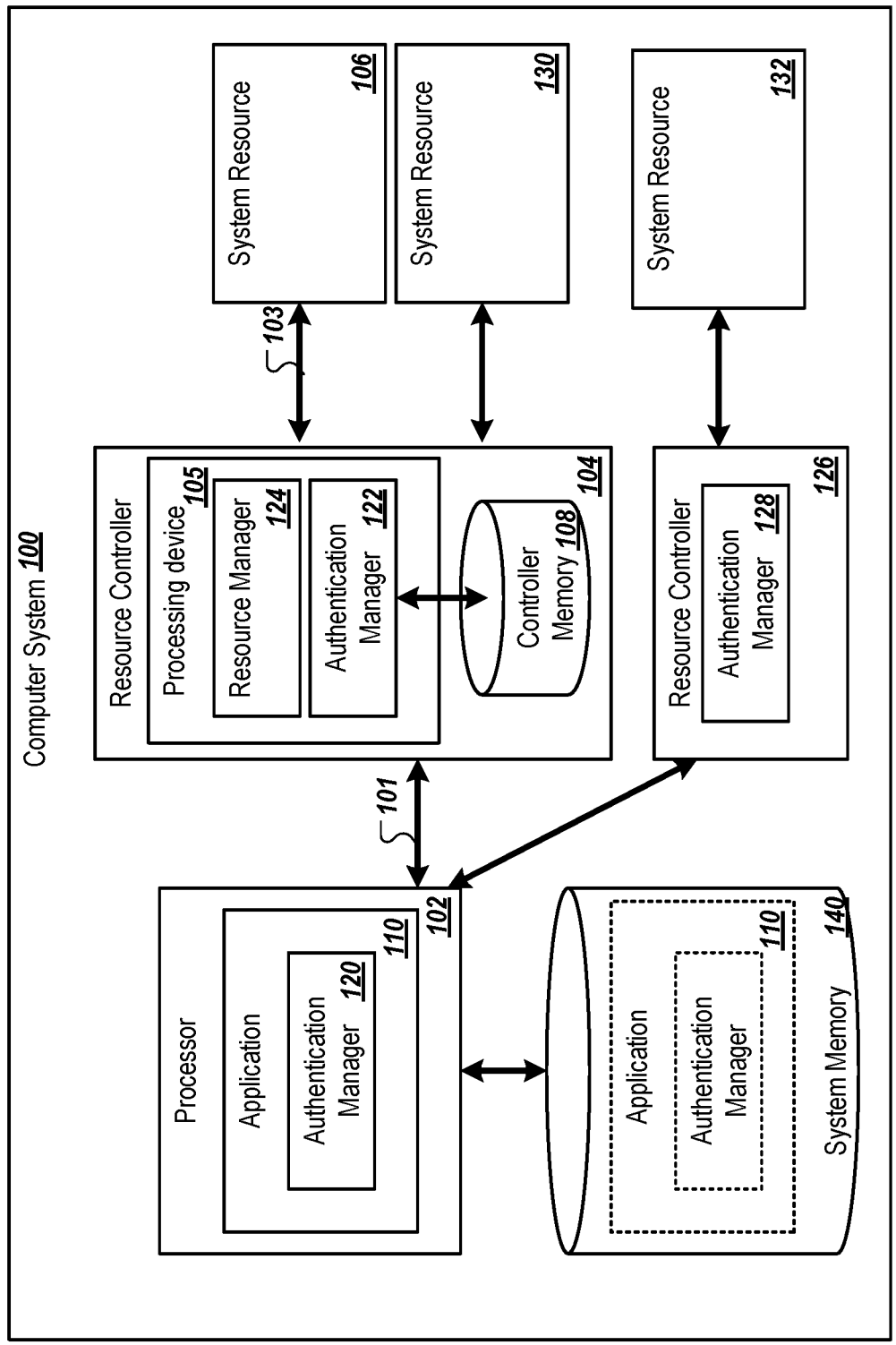
FIG. 1 is a block diagram of a computer system with an authentication manager for application authentication and data encryption without stored pre-shared keys according to one embodiment.

Described herein are technologies for supporting secret-based applications (e.g., authentication and/or data encryption) without the need for stored pre-shared secrets (e.g., pre-shared keys). Conventionally, an application and resource controller exchange pre-shared secrets to authenticate and/or encrypt and decrypt data exchanged between each other. Some computer systems have constrained resources, such as embedded processors or IoT devices, making it difficult to store and protect pre-shared secrets used for authenticating applications and encrypting/decrypting data.

Aspects of the present disclosure address the above and other deficiencies by providing a registration process and an authentication process that does not require storing and sharing pre-shared secrets between the application and the resource controller. Aspects of the present disclosure address the above and other deficiencies by a resource controller providing a current nonce responsive to an application identifier (ID) and providing the application access to a system resource responsive to determining that a hash of a current key received from the application equals a current tag, where the current key is generated by the application based on code of the application and the current nonce, and where the current tag was previously provided from the application to the resource controller. In some cases, the current tag previously provided from the application can be hashed from the current key by the application. It should be noted that "nonce," as used herein can be a value derived from the application identifier and is not always a different value. For instance, the same nonce must be derived for registration and first access, as described herein. Altering the nonce between accesses, however, can provide replay protection. The "nonce," as described herein, can be used as a seed by the application to control the selection of application attributes used to produce the shared secrets (e.g., keys).

For example, considering a computer system in which an application executed by a processor needs to access a system resource through a resource controller, controlling access to the system resource, the application and resource controller do not have any stored secret keys of any type (e.g., symmetric or asymmetric). Using the technologies described herein, the application is able to cryptographically authenticate itself to the resource controller before being granted access to an asset owned by the application that was previously provided to the system resource by the resource controller. If the asset is data, the technologies described herein can encrypt the data prior to being stored in the system resource, in such a way that only the resource controller or application can encrypt it. In one implementation, an application needs access to NVM memory device(s) controlled by an NVM controller in which there are no shared or stored keys between the application and the NVM controller. The systems, protocols, and processes described herein can accomplish authentication, encryption, signing without storing any secret keys in the system. The systems, protocols, and processes can prevent replay attacks in which an adversary observing previous authentications between the application and the resource controller uses that information to impersonate the application.

FIG. 1 is a block diagram of a computer system 100 with an authentication manager 120 for application authentication and data encryption without stored pre-shared keys according to one embodiment. The computer system 100 can include a processor 102 (e.g., a microprocessor), a resource controller 104, a system resource 106, and system memory 140. The processor 102 is capable of executing general applications. The application 110 is capable of computing cryptographic hashes and Message Authentication Codes (MACs). The application may also have the capability to encrypt and MAC data. The application 110 includes an authentication manager 120 that is capable of generating a set of memory addresses associated with its own set of program instructions. For example, the authentication manager 120 can use a nonce (random or pseudo random) and an address generation algorithm to generate the memory addresses. These memory addresses can be used to generate an authentication tag (AT) based on the application's own code. The AT can be considered a fingerprint or signature of at least some of the application's code. For example, the address generation algorithm can use a standard pseudo random number generation (PRNG) process that is seeded with the nonce. The resource controller 104 can provide the nonce to the authentication manager 120 to generate the AT. The output of the PRNG process can be modified to correspond to appropriate memory addresses where the application 110 is stored in system memory 140. Alternatively, a proprietary algorithm can receive the nonce from the resource controller 104 and output a set of memory addresses. The values stored at these memory addresses can be used to generate the AT (e.g., fingerprint or signature) of at least a portion of the application 110. The resource controller 104 includes authentication manager 122 for communicating with the authentication manager 120 for the application 110. The resource controller 104 can also include a resource manager 124 for communicating with the system resource 106. The authentication manager 122 and the resource manager 124 can be separate software components. In other embodiments, the capabilities of the authentication manager 120 and the authentication manager 122 can be implemented in the application 110 and the resource controller 104, respectively. The resource controller 104 is capable of generating a nonce (random or pseudo random), computing cryptographic hashes, MACs, and comparing data values. The resource controller 104 can also include controller memory 108 and is capable of storing certain values in the controller memory 108. The controller memory 108 can be volatile or non-volatile such as Flash, EEPROM, or OTP, depending on whether the data needs to survive a power cycle. The system resource 106 can be any resource where access is protected by the resource controller 104. The resource controller 104 can also control access to additional system resources, such as system resource 130 illustrated in FIG. 1. The computer system 100 can also include multiple resource controllers, such as illustrated by resource controller 126 that controls access to system resource 132. The resource controller 126 can include authentication manager 128 similar to the authentication manager 122 described herein.

In some implementations, a subcomponent of the resource controller 104 (e.g., authentication manager 122) provides both a first nonce to the application 110 to generate the authentication tag as well as a second nonce to the application 110 to generate a key, such as an encryption key for encrypting data or a signing key for signing data, or both. In other implementations, the resource controller 104 provides three separate nonces—a first nonce for generating the authentication tag, a second nonce for generating the encryption key, and a third nonce for generating the signing key. Alternatively, the resource controller 104 provides a single nonce and the application 110 derives one or more keys from the single nonce. When deriving multiple keys from the same nonce, the application 110 can generate keys that are cryptographically separated keys.

In one embodiment, the resource controller 104 includes a first interface to communicate with the application 110 executing on the processor 102. The processor 102 and the resource controller 104 can be coupled via a first interconnect 101, such as a bus. The resource controller 104 also includes a second interface to communicate with system resource 106. The resource controller 104 and the system resource 106 can be coupled via a second interconnect 103. In some cases, the resource controller 104 and the system resource 106 are implemented on the same integrated circuit substrate or package. In other implementations, the resource controller 104 and the system resource 106 are implemented as separate integrated circuits or in separate packages, depending on the particular system resource. The resource controller 104 includes a processing device 105 that is coupled to the first interface and the second interface. The processing device 105 can be a processor, a microcontroller, a processing element, or the like. The processing device 105 can execute operations of the resource manager 124 and the authentication manager 122 to communicate with the system resource 106 via the second interconnect 103 and to communicate with the application 110 via the first interconnect 101, respectively. The processing device 105 can use the authentication manager 122 to authenticate the application 110. The processing device 105 can receive an application identifier (ID) from the application 110. The processing device 105 can provide a current nonce responsive to the application ID. The processing device 105 can provide the application 110 access to the system resource 106 responsive to determining that a hash of a current key received from the application 110 equals a current tag. The current key is generated by the application 110 based on code of the application 110 and the current nonce. The current tag was previously provided from the application 110 to the resource controller 104. In a further embodiment, the current tag, provided from the application 110, can be hashed using the current key by the application 110.

In one embodiment, the controller memory 108 can be one or more memory devices coupled to the processing device 105. The processing device 105 can store a table in the controller memory 108. The table can store information for each application registered to the resource controller 104. Additional details regarding a registration process are described below. In another embodiment, the processing device 105 stores the application ID, the current nonce, and the current tag in the controller memory 108. This can be an entry in the table. The processing device 105 can mark the application ID, the current nonce, and the current tag as valid. For example, the application ID, the current nonce, and the current tag can be stored as an entry in the table and the processing device 105 can mark the entry as valid. The processing device 105 can also store the application ID and a new nonce, once generated, and marks the application ID and the new nonce as invalid. For example, the application ID and the new nonce can be stored in a new entry and the new entry is marked as invalid. The table can be used to track the application ID, the current tags with the respective nonce. In another embodiment, the processing device 105 stores the application ID, the current nonce, the current tag, and a second nonce and marks them as valid. The second nonce can be an encryption nonce (e.g., nonce used by the application 110 to generate an encryption key), a signature nonce, also referred to as a MAC nonce (e.g. nonce used by the application 110 to generate a signature key, also referred to as a MAC key) or a nonce used for other encryption, authentication, or verification purposes. The processing device 105 can also store the application ID, a new authentication nonce, a third nonce, corresponding to a new encryption nonce or MAC nonce when a new encryption key or new MAC key is needed by the application 110. The processing device 105 can mark these as invalid. The processing device 105 can also store the application ID, the current nonce, the current tag, a second nonce, and a third nonce in the controller memory 108. The current nonce can be an authentication nonce, the second nonce can be an encryption nonce, and the third nonce can be a MAC nonce.

The processing device 105 can generate a new authentication nonce each time the application 110 needs to be authenticated. The next session, a new authentication key and authentication tag can be generated. The processing device 105 can generate a new encryption nonce or the MAC nonce only when the encryption key or MAC key need to be updated since the encryption key should not change during each session between the application 110 and the resource controller 104. That is, if a first encryption key changes to a second encryption key without first decrypting the encrypted data with the first encryption key, the data can be lost. When generating a new nonce, the resource controller 104 needs to request the previous key to match it to the application 110. It should be noted that this is another instance where the resource controller produces the same nonce based upon the application ID.

In one embodiment, the resource controller 104 is a NVM controller with the authentication manager 122 that communicates with the authentication manager 120 of the application 110. The system resource 106 can be one or more NVM devices controlled by the NVM controller. The NVM controller, via the authentication manager 122, can authenticate the application 110 before allowing access to the NVM devices, such as reading data from or writing data to the NVM devices, using the processes described herein. The application authentication can be done for any application, regardless of a privilege level of the application. That is, the authentication process can be privilege-level agnostic. As described herein, the application and the NVM controller do not store pre-shared keys in order to authenticate the application before allowing access. In another embodiment, the system resource 106 is a cryptographic engine. In another embodiment, the system resource 106 is a peripheral device, such as an input device, an output device, or an input-output device. The resource controller 104 can be a controller that controls access to the cryptographic engine, the peripheral device, or other system resources.

In one embodiment, the computer system 100 can be resource constrained or a system with limited resources. The computer system 100 can utilize the authentication manager 122 to reduce the amount of resources needed to exchange and store the pre-shared keys for authenticating the application 110, since the embodiments described herein do not exchange and store pre-shared keys. The authentication manager 120 can generate a key (referred to herein as authentication key) based on a signature or a fingerprint of the application's code (i.e., a set of program instructions corresponding to the application) as described herein. That is, the authentication manager 120 can use the nonce as a seed to identify attributes of the application to be used to produce a secret (i.e., secret=g{f(application, nonce)}). In the case of the authentication manager 120 generating a key based on the signature or fingerprint of the application's code, the attributes are code words from the application 110, but can be other items in other embodiments. The functions to generate the secret can be cryptographic functions or non-cryptographic functions. The authentication manager 120 can cryptographically hash the authentication key to generate the authentication tag that is shared back to the resource controller 104 for authenticating the application 110, as identified by an application ID. The resource controller 104 can provide a nonce that is used to seed a random selection of instruction of the application 110 itself to generate the authentication key and authentication tag. The authentication manager 120 can also generate one or more keys for encrypting, signing, or both, data exchanged between the application 110 and the resource controller 104 as described herein. That is, the resource controller 104 can provide a nonce that is used to seed another random selection of instruction of the application 110 itself to generate the encryption key. Another random selection of instructions can be used to generate a signature key or a MAC key, as described herein.

In the computer system 100, where the resource controller 104 is an NVM controller and the system resource 106 is NVM device(s), the NVM controller can restrict access to the NVM device(s). The NVM controller can require that an application authenticate itself with the NVM controller to gain access (e.g., read data from the NVM device(s) and/or write data to the NVM device(s)). Instead of the application 110 and NVM controller exchanging and storing a pre-shared key, in order for the application 110 to authenticate itself with the NVM controller, the application 110 provides an application ID, receives an authentication nonce, and generates an authentication key and an authentication tag. The application 110 provides the authentication tag to the NVM controller in a registration process. After the registration process, in order to gain access to the NVM device(s), the application 110 can send an authentication request with the application ID and receives the first authentication nonce (e.g., $AARN_i$) and a second authentication nonce (e.g., $AARN_{i+1}$). The application 110 can send an access request with the authentication key and a second authentication tag. The NVM controller verifies that a result of hashing the first authentication key matches the first authentication tag. Additional details of the registration process and the authentication process are described below.

Figure 2:
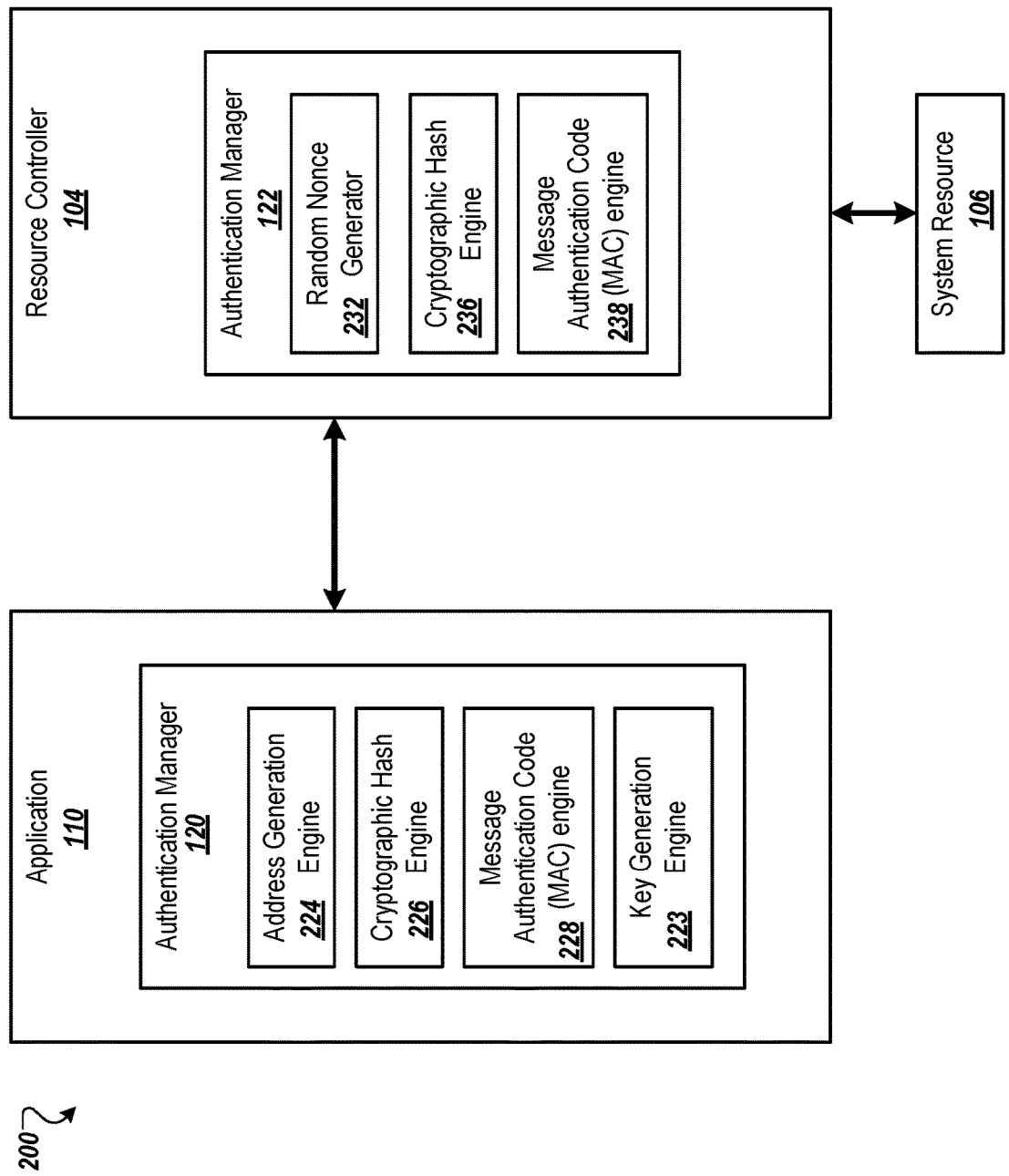
FIG. 2 is a block diagram of an authentication system in which an application and a resource controller with application managers perform a registration process and an authentication process without stored pre-shared keys according to one embodiment.

FIG. 2 is a block diagram of an authentication system 200 in which the application 110 and the resource controller 104 with application managers perform a registration process and an authentication process without stored pre-shared keys according to one embodiment. The application 110 includes the authentication manager 120 and the authentication manager 120 can include one or more software components, such as a key generation engine 223, an address generation engine 224, a cryptographic hash engine 226, and a MAC engine 228 (or other types of signing engines). The authentication manager 122 of the resource controller 104 can include one or more software components, such as a random number generator 232, a cryptographic hash engine 236, and a MAC engine 238 (or other types of signing engines). In some embodiments, some or all of these components can be implemented as hardware circuits. The key generation engine 223 can be used to generate one or more keys, such as authentication keys, encryption keys, MAC keys, or other signing keys using the nonce(s) provided by the resource controller 104.

The random number generator 232 can generate a random number that can be used as a random number. The random nonce can be an application authentication random nonce (AARN), an encryption random nonce (ERN), or a data authentication random nonce (DARN). For example, the random number generator 232 can generate an AARN, an ERN, and a DARN and provide these nonces to the application 110. The nonce can be a seed value used by the address generation engine 224. The address generation engine 224 can receive a nonce as an input and can generate a select a set of memory addresses associated with a set of program instructions of the application 110. In one embodiment, the address generation engine 224 can use an address generation algorithm to generate the memory addresses. These memory addresses can be used to generate an authentication tag (AT) based on the application's own code. The AT can be considered a fingerprint or signature of at least some of the application's code. For example, the address generation algorithm can use a standard PRNG process that is seeded with the nonce. The output of the PRNG process can be modified to correspond to appropriate memory addresses where the application 110 is stored in system memory 140. Alternatively, a proprietary algorithm can receive the nonce from the resource controller 104 and output a set of memory addresses. The values stored at these memory addresses can be used to generate the AT (e.g., fingerprint or signature) of at least a portion of the application 110. In one embodiment, the address generation engine 224 can access the memory address and can use the values stored at those memory addresses to generate the authentication key (AK) and the cryptographic hash engine 226 can hash the AK to generate the authentication tag (AT). In another embodiment, the key generation engine 223 can receive the memory addresses that are output from the address generation engine 224 and can generate the AK using the values at the memory addresses identified by the address generation engine 224. The cryptographic hash engine 226 can receive the AK from the key generation engine 223 and can hash the AK to generate the AT.

The key generation engine 223 can be used to generate the authentication key and optionally the encryption key, MAC key, or both. The authentication key can be generated based on a first set of instructions using the AARN, the encryption key can be generated based on a second set of instructions using the ERN. The MAC key can be generated based on a third set of instructions using the DARN. Alternatively, the key generation engine 223 can generate the authentication key, the encryption key, the MAC key, or any combination thereof using a single nonce received from the resource controller 104. In another embodiment, the key generation engine 223 can generate the authentication key based on a first nonce and the encryption key and/or MAC key based on a second nonce. The cryptographic hash engine 226 can perform cryptographic hashes, such as cryptographically hashing the AK to generate the AT. The MAC engine 228 can be used to sign data using a MAC key, derived from the DARN provided by the resource controller 104.

The cryptographic hash engine 236 of the authentication manager 122 of the resource controller 104 can cryptographically hash values. The MAC engine 238 can be used to verify data that has been signed with a MAC key.

As described herein, the authentication manager 120 can store its own data and MACs computed for the data in the system memory 140, but does not store keys, tags, and nonces in the system memory 140. The application 110 can receive nonces and can compute the keys and tags on demand, use the keys and tags, and/or nonces as necessary, and return what is necessary to the resource controller 104, and then delete the keys, tags, and/or nonces. Subsequently, the application 110 can recalculate the keys, tags, and/or nonces as necessary. The authentication manager 120 can store some data, keys, tags, and nonces that need to be saved in controller memory 108. In some embodiments, the system resource 106 is memory that can store application data. In these embodiments, the controller memory 108 does not store the application data, but can store metadata, such as application ID, AT, authentication keys, encryption keys, MAC keys, or the like.

Figure 3:
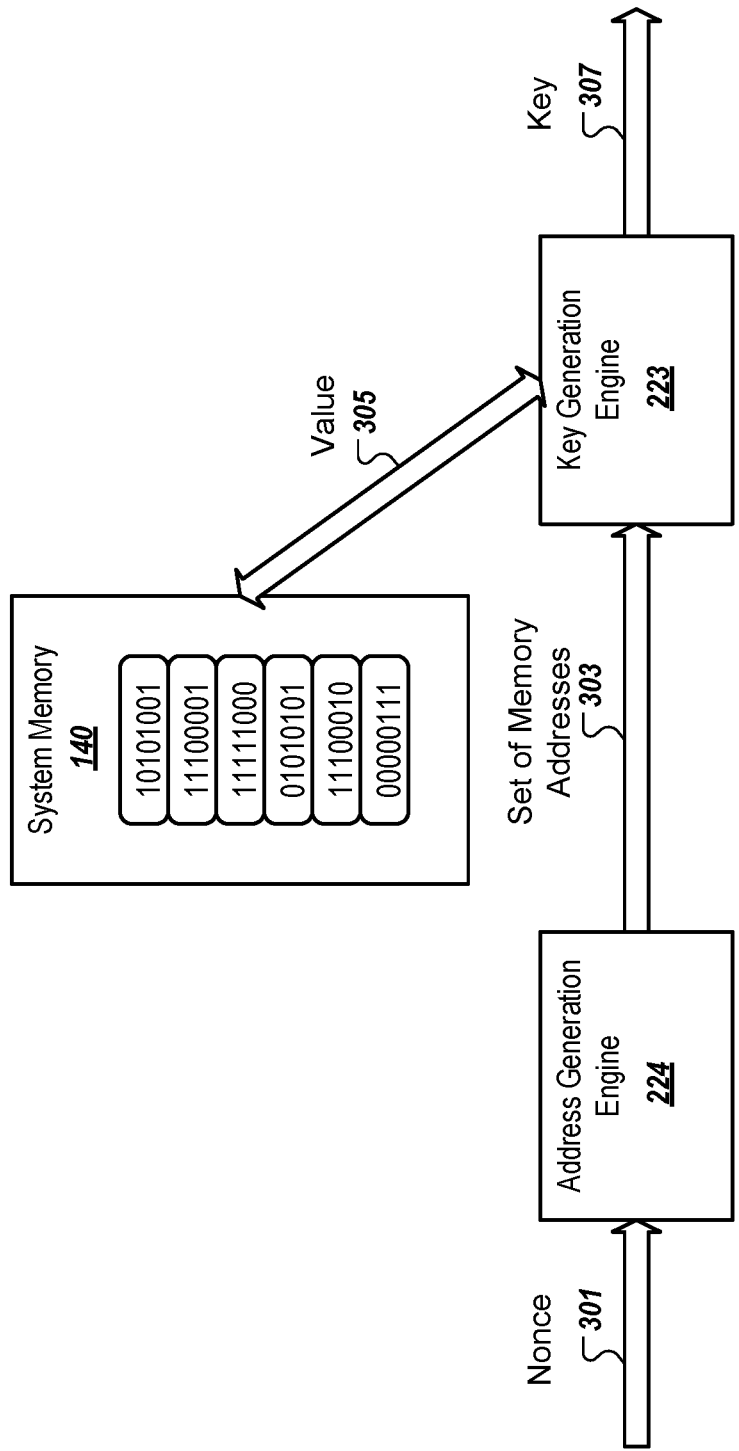
FIG. 3 is a block diagram of an address generation engine and a key generation engine according to one embodiment.

FIG. 3 is a block diagram of an address generation engine 224 and a key generation engine 223 according to one embodiment. The address generation engine 224 receives a random nonce 301 as an input. The address generation engine 224 uses an address generation algorithm, seeded by the random nonce 301, to generate a set of memory addresses 303. The set of memory addresses 303 can be a pointer, including a base address and an offset, or a pointer with just the offset. The set of memory addresses 303, generated by the address generation engine 224, are input into the key generation engine 223. The key generation engine 223 reads values 305 stored each of the set of memory addresses 303 and uses the values 305 to generate a key 307. The key 307 is generated based on the random nonce 301 and uses values that make up the application 110 itself. That is the memory addresses that are randomly selected are only memory addresses where the application itself is stored. When the application 110 is updated, the application 110 has to repeat registration and authentication since the underlying values at the memory addresses could have changed when the application 110 is updated.

The following description is directed to a registration process, as illustrated and described below with respect to FIG. 4, an authentication process, as illustrated and described below with respect to FIG. 5, and an updated registration and authentication process, as illustrated and described below with respect to FIG. 6 that can be performed by the application 110 and the resource controller 104.

Figure 4:
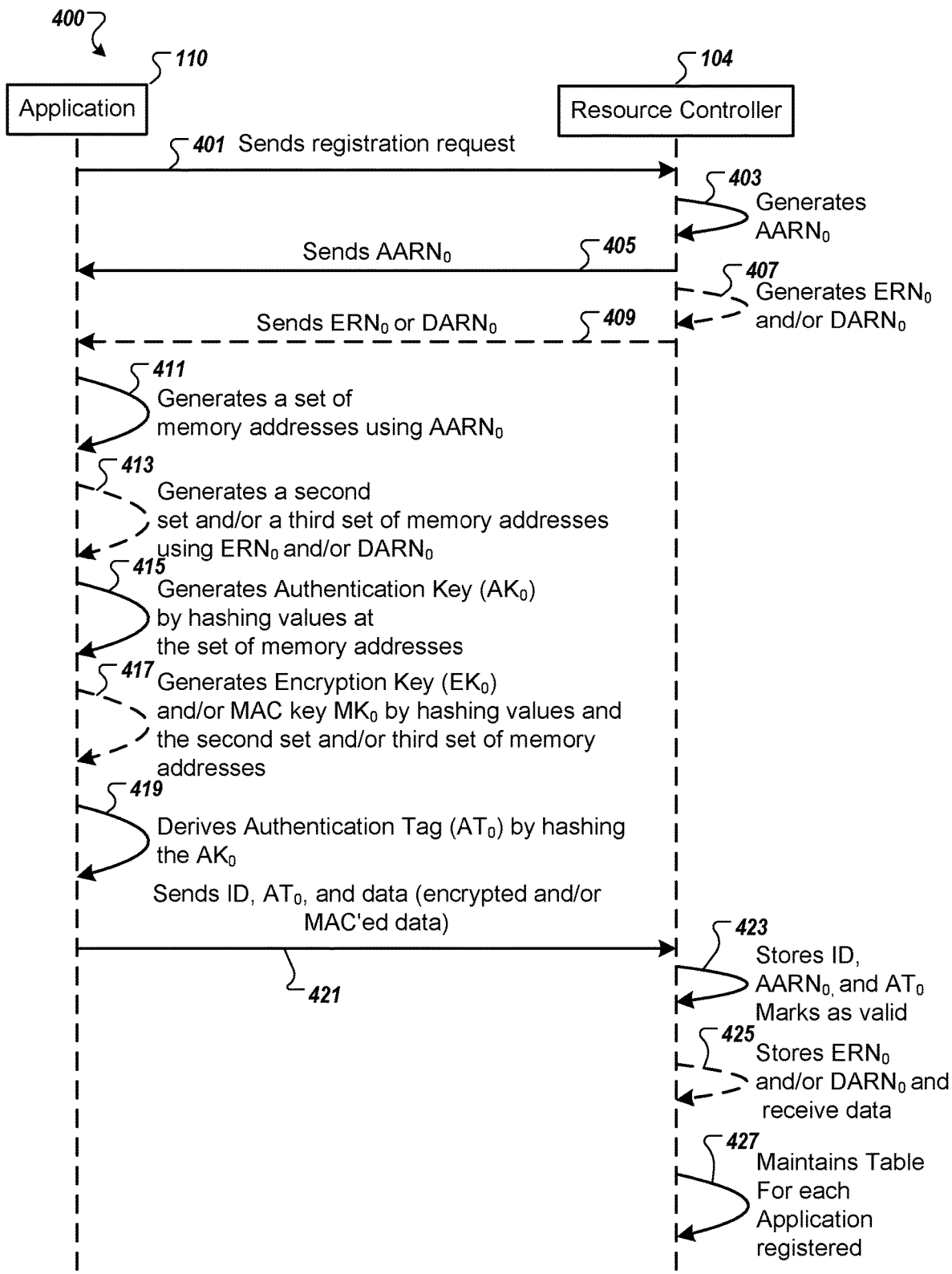
FIG. 4 is a sequence diagram of a registration process according to one embodiment.

FIG. 4 is a sequence diagram of a registration process 400 according to one embodiment. When the application 110 tries to access the system resource 106 for a first time, the application 110 registers with the resource controller 104 in the registration process 400. In the registration process 400, the application 110 sends 401 a registration request to the resource controller 104 and the resource controller 104 generates 403 a first application Authentication Random Nonce ($AARN_0$) and sends 405 the first $AARN_0$ to the application 110. Optionally, if the system resource 106 is capable of storing data and the application 110 wants to encrypt and/or sign data (e.g., also referred to as MAC'ing data) prior to storing at the system resource 106, the resource controller 104 generates 407 a first Encryption Random Nonce $ERN_0$ and/or a first Data Authentication Random Nonce ($DARN_0$) and sends 409 the first $ERN_0$ and/or the first $DARN_0$ to the application 110. The reason for allowing different random nonces for application authentication and data encryption/MAC'ing is that the application authentication data (e.g., AK and AT) will change each time the system resource 106 is accessed, as shown and described below, but the same encryption/MAC keys may be used by the application 110 across multiple accesses. To simplify the exposition, the following describes how the system works with a single Encryption Key (EK), derived from ERN and used for both data encryption and MAC'ing. However, it is a straightforward extension to use a separate ERN and DARN to derive separate Encryption Keys and MAC Keys (EK and MK). It is also possible that the system only requires the data to be MAC'ed, but not encrypted, in which only the DARN is generated and sent. It is also possible to generate and send a single random nonce that can be used by the application 110 to derive cryptographically separated keys for AK, EK, MK, or any combination thereof.

Referring back to FIG. 4, the application 110 uses the first $AARN_0$ to generate 411 a set of memory addresses associated with its own set of program instructions. Optionally, the application 110 uses the first $ERN_0$ to generate 413 additional sets of memory addresses associated with its own set of program instructions (e.g., second and/or third set of memory addresses using $ERN_0$ and/or $DARN_0$). The application 110 generates 415 a first Authentication Key ($AK_0$) by cryptographically hashing the values stored at the addresses generated using the $AARN_0$. Optionally, the application 110 generates 417 a first Encryption Key ($EK_0$) and/or a first MAC key ($MK_0$) by cryptographically hashing the values stored at the second and/or third set of addresses generated using the $ERN_0$ and/or the $DARN_0$. The application 110 derives 419 a first Authentication Tag ($AT_0$) by cryptographically hashing the first $AK_0$. The application 110 sends 421 an application ID, $AT_0$, and any encrypted/MAC'ed data to be stored to the resource controller 104. The resource controller 104 stores 423 the application ID, the $AARN_0$, and $AT_0$, such as in a table maintained by the resource controller 104 and marks them as valid. Optionally, the resource controller 104 stores 425 the $ERN_0$ and/or $DARN_0$ and any data the application 110 wants to store. The storage can be in either volatile or non-volatile memory, depending on whether the registration of the application 110 needs to survive a power cycle. As noted herein, the resource controller 104 maintains a table containing the information for each application 110 registered with it. After registration, the application 110 authenticates itself, the application can 110 can request access to the system resource 106, and optionally to the previously stored data, as set forth in an authentication process as described below with respect to FIG. 5.

Figure 5:
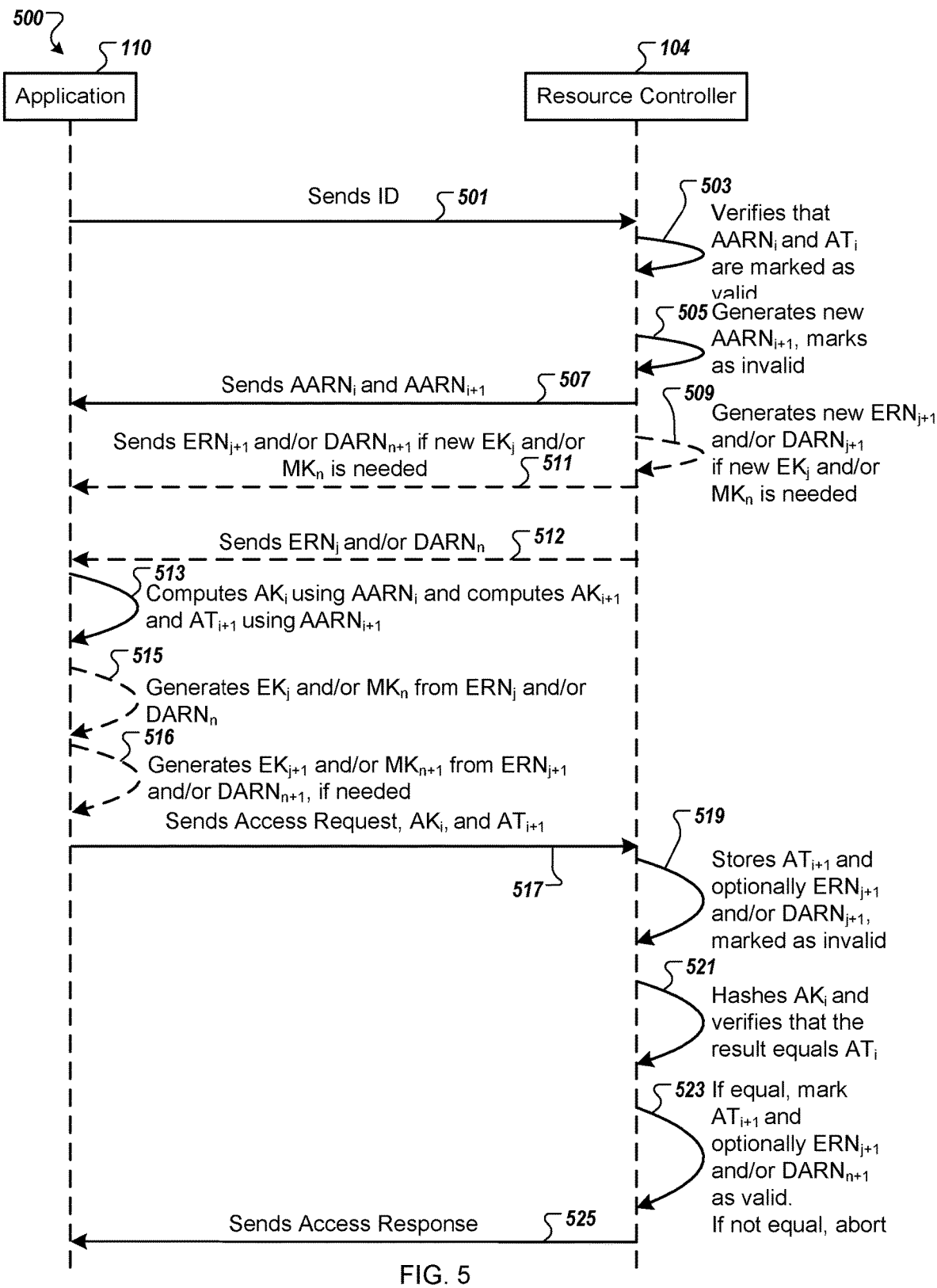
FIG. 5 is a sequence diagram of an authentication process according to one embodiment.

FIG. 5 is a sequence diagram of an authentication process 500 according to one embodiment. After the registration process 400, when the application 110 tries to access the system resource 106, the application 110 authenticates itself with the resource controller 104 in the authentication process 500. In the authentication process 500, the application 110 sends 501 an application ID to the resource controller 104. The resource controller 104 verifies 503 that the current $AARN_i$ and $AT_i$ are marked as valid. If this is the first time performing the authentication process 500, the current $AARN_i$ is the $AARN_0$ and the current $AT_i$ is $AT_0$. The authentication process 500 is aborted if the current $AARN_i$ and $AT_i$ are marked invalid. If marked as valid, the resource controller 104 generates 505 and stores new authentication data $AARN_{i+1}$ and marks the new authentication data $AARN_{i+1}$ as invalid. The resource controller 104 sends $AARN_i$ and $AARN_{i+1}$ to the application 110. Optionally, the resource controller 104 generates 509 and sends 511 new $ERN_{j+1}$ and/or $DARN_{n+1}$ if the application 110 needs to generate a new encryption key and/or a new MAC key. The resource controller 104 stores the new $ERN_{j+1}$ and/or $DARN_{n+1}$ and marks them as invalid. This would be if the application 110 is going to re-encrypt and/or re-sign using new keys. However, the application 110 may not need to update the keys, in which case only the current $ERN_j$ and/or $DARN_n$ are sent 512.

The application 110 computes 513 $AK_i$ using $AARN_i$ and computes $AK_{i+1}$ and $AT_{i+1}$ using $AARN_{i+1}$ and sends 517 its access request, $A_i$ and $AT_{i+1}$ to the resource controller 104. Optionally, the application 110 also generates 515 an encryption key ($EK_j$) and/or MAC key ($MK_n$) using $ERN_j$ and/or $DARN_n$. If necessary, the application 110 also generates 516 a new encryption key ($EK_{j+1}$) and/or MAC key ($MK_{n+1}$) using $ERN_{j+1}$ and/or $DARN_{n+1}$. The resource controller 104 hashes 521 $AK_i$ and verifies that the result equals $AT_i$. It should be noted that the application 110 can perform the encryption and signing, but the resource controller 104 can perform encryption and signing, as described below. If they are equal, the resource controller 104 marks 523 $AT_{i+1}$ and optionally $ERN_{j+1}$ and/or $DARN_{n+1}$ as valid. If they are not equal, the resource controller 104 aborts the authentication process 500. The resource controller 104 sends 525 an access response to the application 110. If access is granted, the resource controller 104 allows the application 110 access to the resource.

The system and protocol above is designed to prevent replay attacks in which an adversary observing previous authentications between the application 110 and resource controller 104 uses that information to impersonate the application 110. An adversary wishing to impersonate the application 110 must resort to more sophisticated and invasive attacks. The protocol is also secure against "tearing" attacks, in which an adversary glitches the device or withdraws power during an update of the authentication data. If the new nonce and tag $AARN_{i+1}$ and $AT_{i+1}$ remain marked as invalid, neither the application 110 nor adversary will be able to access the system resource 106 and/or application data. The system can be designed to enable re-registration of the application 110 to allow it to access the system resource 106 again, and either be given or denied access to data previously stored by the application 110. The more secure option is to deny access to all data previously stored by the application 110.

In some cases, the program instructions at a given memory location may change due to an update in the code or a runtime event. If that memory location is part of the region previously used to generate $EK_j$ or $MK_n$, the $EK_j$ or $MK_n$ will become invalid. In such cases, the system will support re-encryption or re-signing the data as part of the updated and authentication process as described below with respect to FIG. 6.

Figure 6:
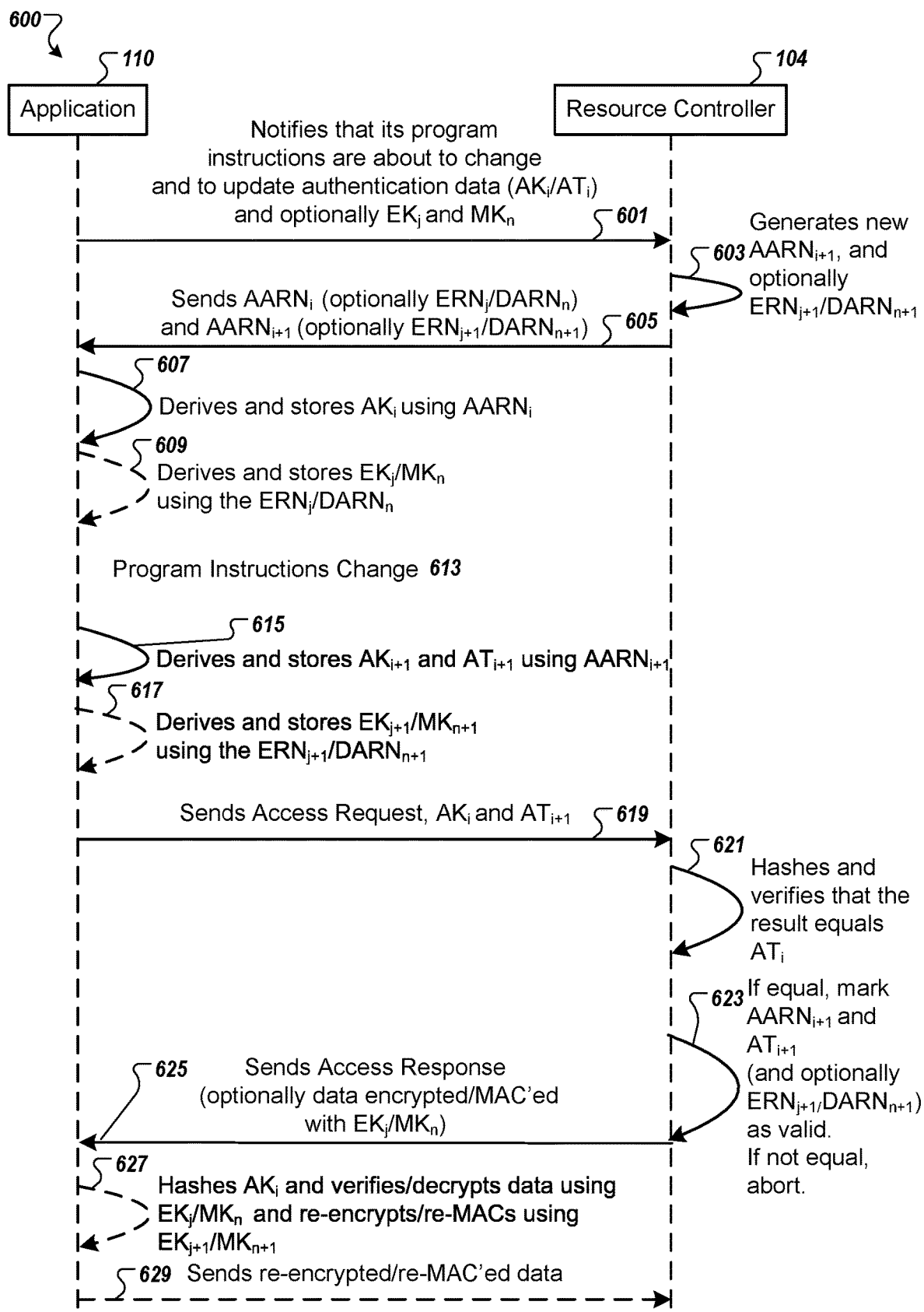
FIG. 6 is a sequence diagram of an updated registration and authentication process according to one embodiment.

FIG. 6 is a sequence diagram of an updated registration and authentication process 600 according to one embodiment. In the event that the code of the application 110 is updated, the application 110 needs to re-encrypt and re-authenticate with the resource controller 104 in the updated registration and authentication process 600. In the updated registration and authentication process 600, the application 110 notifies 601 the resource controller 104 that its program instructions are about to change and that the authentication data $AK_i/AT_i$, and optionally the encryption/MAC keys $EK_j/MK_n$, need to be updated. The resource controller 104 generates 603 new $AARN_{i+1}$ (and optionally $ERN_{j+1}/DARN_{n+1}$) and sends 605 and $AARN_i$ (and optionally $ERN_j/DARN_n$) and $AARN_{i+1}$ (and optionally $ERN_{j+1}/DARN_{n+1}$) to the application 110. The application 110 derives 607 and stores authentication data $AK_i/AT_i$ using $AARN_i$. Optionally, the application 110 derives 609 and stores encryption/MAC keys $EK_j/MK_n$ using $ERN_j/DARN_n$. After the application's program instructions have changed 613, the application 110 derives 615 and stores new authentication data $AK_{i+1}$ and $AT_{i+1}$ using $AARN_{i+1}$ and optionally generates 617 and stores a new encryption key $EK_{j+1}$ and/or a new MAC key $MK_{n+1}$ using $ERN_{j+1}$ and/or $DARN_{n+1}$. The application 110 then authenticates itself to the resource controller 104 using the authentication protocol above. As shown in FIG. 6, the application 110 sends 619 an access request, the $AK_i$, and $AT_{i+1}$ to the resource controller 104. The resource controller 104 hashes 621 $AK_i$ and verifies that the result equals $AT_i$. If they are equal, the resource controller 104 marks 623 $AARN_{i+1}$, $AT_{i+1}$ (and optionally $ERN_{j+1}$ and/or $DARN_{n+1}$) as valid. If they are not equal, the resource controller 104 aborts the updated registration and authentication process 600. The resource controller 104 sends 625 an access response to the application 110 and optionally sends data encrypted/MAC'ed with $EK_j/MK_n$. The application 110 verifies/decrypts 627 its data using $EK_j/MK_n$, and re-encrypts/re-MACs using $EK_{j+1}/MK_{n+1}$, and optionally sends 629 the re-encrypted/re-signed data and $AT_{i+1}$ to the resource controller 104 for storage.

In all the above protocols, the application 110 performs its own data encryption and MAC'ing. In some systems it may be preferable to have the resource controller 104 perform these operations. In this case, the application 110 would send its encryption/MAC keys $EK_j/MK_n$ to the resource controller 104 for the resource controller 104 to use and then clear the encryption/MAC keys $EK_j/MK_n$ when done.

Figure 7:
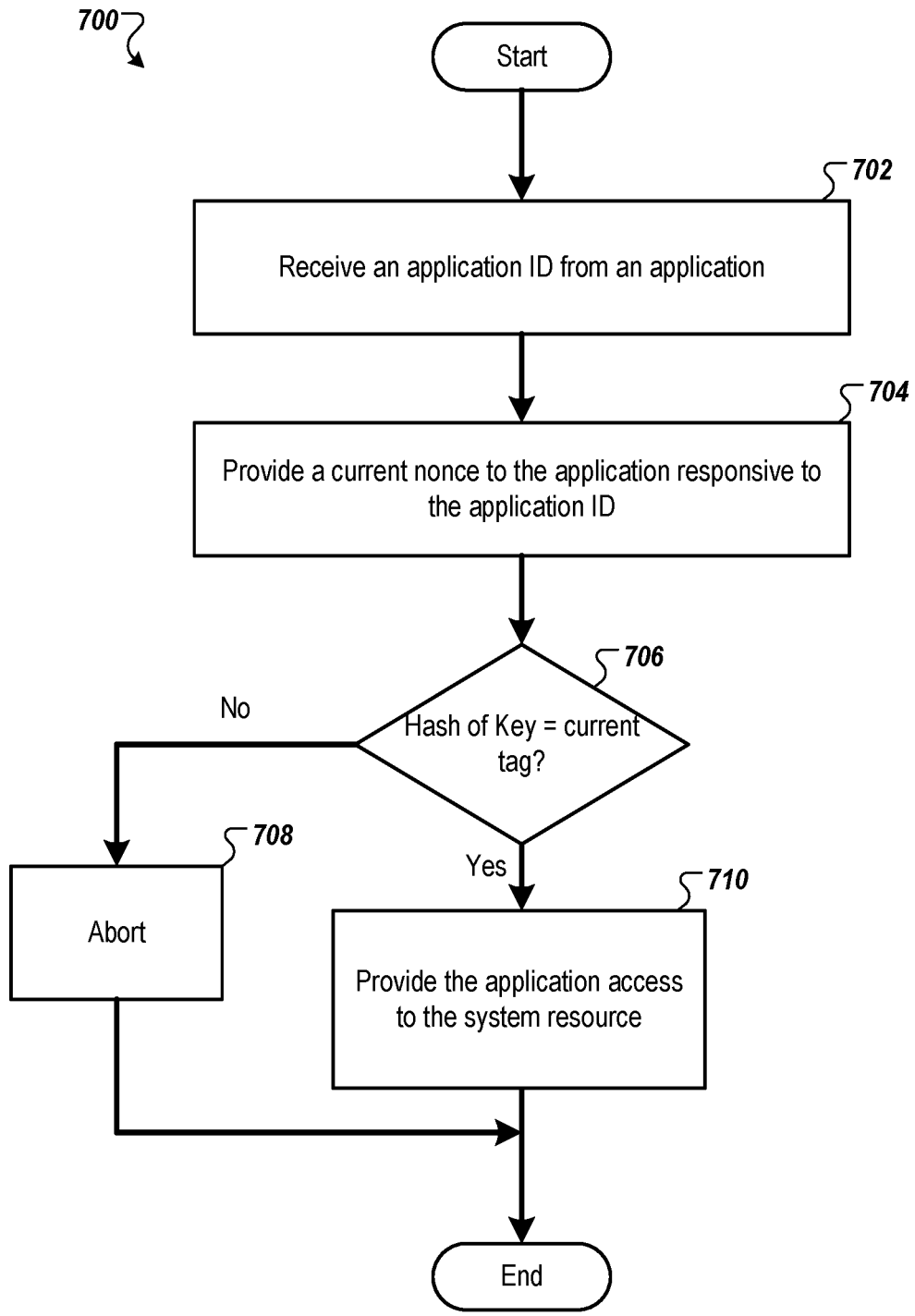
FIG. 7 is a flow diagram of a method of providing an application access to a system resource according to one embodiment.

FIG. 7 is a flow diagram of a method 700 of providing an application access to a system resource according to one embodiment. The method 700 is performed by processing logic comprising hardware, software, firmware, or any combination thereof. The method 700 can be performed by the resource controller 104 of FIGS. 1-6.

Referring back to FIG. 7, the method 700 begins by the processing logic receiving an application ID from an application (block 702). The processing logic provides a current nonce to the application responsive to the application ID (block 704). The processing logic determines whether a hash of a current key received from the application equals a current tag (block 706). If at block 706, the processing logic determines that the hash of the current key is not equal to the current tag, the method 700 aborts (block 708). If at block 706, the processing logic determines that the hash of the current key is equal to the current tag, the processing logic provides the application access to the system resource (block 710), and the method 700 ends. The current key is generated by the application based on code of the application and the current nonce and the current tag was previously provided from the application.

In a further embodiment, the processing logic receives the current tag from the application and the current tag was hashed using the current key by the application.

In a further embodiment, the processing logic receives a registration request from the application, the registration request including the application ID. The processing logic generates a first AARN in response to the registration request, where the first AARN is the current nonce. The processing logic sends the first AARN to the application. The current key can be a first authentication key (AK) generated by the application using values stored at a set of memory addresses in system memory based on the first AARN. The set of memory addresses is associated with the code (e.g., a set of program instructions) of the application. The current tag can be a first authentication tag (AT) derived by the application cryptographically hashing the first AK. The processing logic receives the application ID and the first AT from the resource controller and stores in a table in memory of the resource controller, the application ID and the first AT. The processing logic marks the application ID and the first AT stored in the table as valid.

In another embodiment, the processing logic receives receiving an authentication request with the application ID from the application. The processing logic verifies that the first AARN and first AT are marked as valid in the table, otherwise the process is aborted if marked as invalid. The processing logic generates a second AARN responsive to the authentication request, stores storing the second AARN in the table, and marks the second AARN in the table as invalid. The processing logic sends the first AARN and the second AARN to the application responsive to the authentication request. The processing logic receives an access request, the first AK, and a second AT from the application. The second AT is derived by the application. The processing logic verifies that a result of hashing the first AK equals the first AT. The processing logic marks, the second AARN and the second AT in the table as valid responsive to the result being equal to the first AT; otherwise, the process is aborted. The processing logic sends an access response to the application responsive to the access request, the access response allowing the application access to the system resource.

In another embodiment, the processing logic generates a first encryption random nonce (ERN) and sends the first ERN to the application in response to the registration request. A first encryption key (EK) is generated by the application using values stored at a second set of memory addresses in system memory based on the first ERN. The second set of memory addresses is associated with the code (e.g., a second set of program instructions) of the application. The current tag can be a first AT derived by the application cryptographically hashing the first AK. The processing logic receives from the application encrypted data with the access request, the first AK, and the second AT. The encrypted data is encrypted by the application using the first EK. In a further embodiment, the processing logic generates a first data authentication random nonce (DARN) and sends the first DARN to the application in response to the registration request. A first message authentication code (MAC) key (MK) is generated by the application using values stored at a third set of memory addresses in system memory using the first DARN, the third set of memory addresses being associated with the code (e.g., a third set of program instructions) of the application. The processing logic receives from the application signed encrypted data with the access request, the first AK, and the second AT. The signed encrypted data is encrypted by the application using the first EK and the encrypted data is signed by the application using the first MK. In another embodiment, the first AK, the first EK, and the first MK, or any combination thereof are cryptographically separated keys.

In another embodiment, the processing logic generates a first DARN and sends the first DARN to the application in response to the registration request. A first MK is generated by the application using values stored at a second set of memory addresses in system memory using the first DARN, the third set of memory addresses being associated with the code of the application. The processing logic receives from the application signed data with the access request, the first AK, and the second AT. The signed data is signed by the application using the first MK. Alternatively, the first AK and first MK are cryptographically separated keys.

In another embodiment, the processing logic receives from the application at least one of encrypted data, signed data or signed encrypted data. The encrypted data is encrypted by a first EK, the signed data is signed by a first MK, and the signed encrypted data is encrypted by the application using the first EK and signed by the application using the first MK. The first AK, the first EK, and the first MK can be derived by the application using the first AARN. The first AK, the first EK, and the first MK are cryptographically separated keys.

In another embodiment, the processing logic receives from the application an update request, which could include a second authentication request and a re-encryption request, responsive to the application receiving an indication that the set of program instructions of the application at a memory location is to change due to an update in the set of program instructions or a runtime event. The memory location corresponds to at least one of the second set of memory addresses. It is unknown if the change to the application impacts the memory location that is part of the region previously used to generate EK. Not changing the EK will cause the data to become invalid. The processing logic sends the first AARN, the first ERN, a second AARN, and a second ERN to the application. After the memory location is changed, the processing logic receives an authentication request from the application with the application ID and a second AT. The processing logic sends to the application data encrypted using the first EK responsive to the application being authenticated. The processing logic receives from the application, re-encrypted data for storage in the system resource. The re-encrypted data is re-encrypted by the application using a second EK. In a further embodiment, the processing logic verifies that the second AARN and the second AT are marked as valid and sends the second AARN and a third AARN to the application responsive to the authentication request. The processing logic receives an access request, a second AK, and a third AT from the application. The processing logic verifies that a result of hashing the second AK equals the second AT. The processing logic marks the third AARN and the third AT in the table as valid responsive to the result being equal to the second AT; otherwise the process aborts. The processing logic sends an access response from the resource controller responsive to the access request. The access response includes the data encrypted using the first EK.

In another embodiment, the processing logic receives an indication that the set of program instructions of the application at a memory location is to change due to an update in the set of program instructions or a runtime event. The memory location corresponds to at least one of the second set of memory addresses. The processing logic sends the first AARN, the first DARN, a second AARN, and a second DARN to the application. After the memory location is changed, the processing logic receives an authentication request from the application with the application ID and a second AT. The processing logic sends to the application data signed using the first MK responsive to the application being authenticated. The processing logic receives from the application re-signed data for storage in the system resource. The re-signed data is re-signed by the application using a second MK. In a further embodiment, the processing logic verifies that the second AARN, the second DARN, and the second AT are marked as valid. The processing logic sends the second AARN, the second DARN, a third AARN, and a third DARN to the application responsive to the authentication request. The processing logic receives an access request, a second AK, and a third AT from the application and verifies that a result of hashing the second AK equals the second AT. The processing logic marks the third AARN, the third DARN, and the third AT in the table as valid responsive to the result being equal to the second AT; otherwise the process aborts. The processing logic sends an access response from the resource controller responsive to the access request. The access response comprises the data signed using the first MK.

Figure 8:
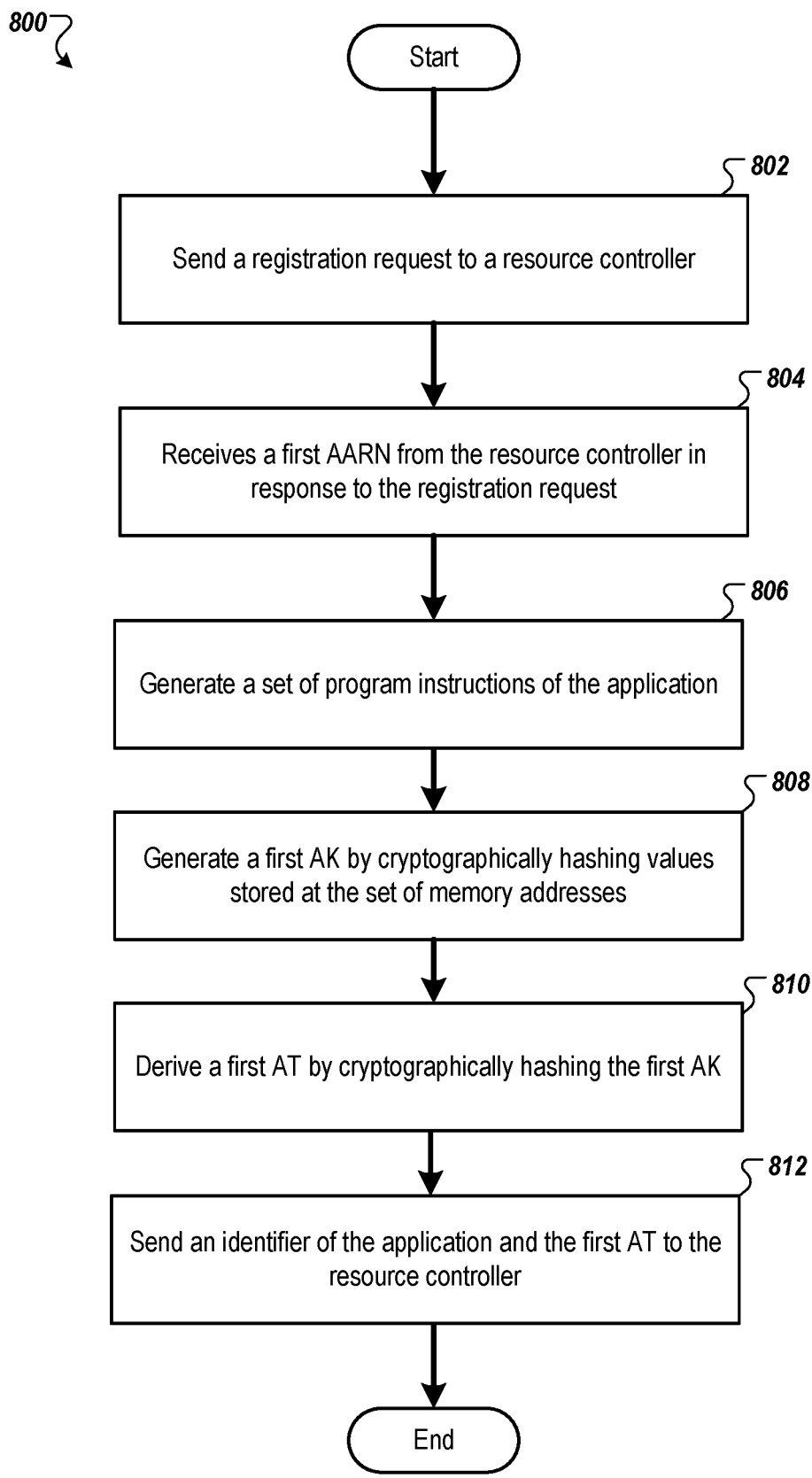
FIG. 8 is a flow diagram of a method of authenticating an application with a resource controller according to one embodiment.

FIG. 8 is a flow diagram of a method 800 of authenticating an application with a resource controller according to one embodiment. The method 800 is performed by processing logic comprising hardware, software, firmware, or any combination thereof. The method 800 can be performed by the application 110 of FIGS. 1-6.

Referring back to FIG. 8, the method 800 begins by the processing logic sending a registration request to a resource controller of a system resource (block 802). The processing logic receives a first AARN from the resource controller in response to the registration request (block 804). The processing logic generates a set of memory addresses in system memory using the first AARN, the set of memory addresses being associated with a set of program instructions of the application (block 806). The processing logic generates a first AK by cryptographically hashing values stored at the set of memory addresses (block 808). The processing logic derives a first AT by cryptographically hashing the first AK (block 810). The processing logic sends an identifier of the application and the first AT to the resource controller (block 812), and the method 800 ends.

In a further embodiment, the processing logic sends an authentication request with an identifier of the application to the resource controller. The processing logic receives the first AARN and a second AARN from the resource controller responsive to the authentication request. If the resource controller verifies that the first AARN and the first AT are marked as valid; otherwise, the process aborts if invalid. The processing logic derives a second AK and a second AT. The processing logic sends an access request, the first AK, and the second AT to the resource controller. The processing logic receives an access response from the resource controller responsive to the access request. The access response allows the application access to the system resource. If the resource controller hashes first AK and verifies that a result of the hash equals the first AT, then second AARN and second AT are marked as valid; otherwise, if the result is not equal, the resource controller aborts the process. In another embodiment, the processing logic receives a first ERN from the resource controller in response to the registration request and generates a second set of memory addresses in system memory using the first ERN, the second set of memory addresses being associated with the set of program instructions of the application. The processing logic generates a first EK by cryptographically hashing values stored at the second set of memory addresses. The processing logic encrypts data using the first EK to obtain encrypted data and sends, to the resource controller, the encrypted data with the access request, the first AK, and the second AT.

In a further embodiment, the processing logic also receives a first DARN and generates a third set of memory addresses in system memory using the first DARN, the third set of memory addresses being associated with the set of program instructions of the application. The processing logic generates a first MK by cryptographically hashing values stored at the third set of memory addresses. The processing logic encrypts data using the first EK to obtain encrypted data and signs the encrypted data using the first MK to obtain signed encrypted data. The processing logic sends to the resource controller the signed encrypted data with the access request, the first AK, and the second AT. In a further embodiment, the processing logic derives a first MK using the first ERN. The first MK and the first AK are cryptographically separated keys In another embodiment, the processing logic receives a first DARN and generates a second set of memory addresses in system memory using the first DARN, the second set of memory addresses being associated with the set of program instructions of the application. The processing logic generates a first MK by cryptographically hashing values stored at the second set of memory addresses and sends the first MK with the access request, the first AK, and the second AT to the resource controller. In another embodiment, the processing logic derives a first encryption key using the first AARN, where the first encryption key (EK) and the first AK are cryptographically separated keys.

In another embodiment, the processing logic derives a first EK using the first AARN, where the first EK and the first AK are cryptographically separated keys and derives a first MK using the first AARN, where the first MK and the first AK are cryptographically separated keys.

In one embodiment, the access request is a read access to read from the system resource data encrypted using a first EK and the access response includes the data. The processing logic can decrypt the data using the first EK to obtain unencrypted data.

In another embodiment, the processing logic receives an indication that the set of program instructions of the application at a memory location is to change due to an update in the set of program instructions or a runtime event. The memory location corresponds to at least one of the second set of memory addresses. The processing logic sends an update request to the resource controller. The processing logic receives the first AARN, the first ERN, a second AARN, and a second ERN from the resource controller. The processing logic derives the first AK using the first AARN and the first EK using the first ERN and stores the first AK and the first EK. After the memory location is changed, the processing logic generates a second AK using the second AARN and a second EK using the second ERN and stores the second AK and the second EK. The processing logic authenticates the application to the resource controller as described above. The processing logic receives data encrypted using the first EK responsive to the application being authenticated. The processing logic decrypts the data using the first EK to obtain unencrypted data and re-encrypts the unencrypted data using the second EK to obtain encrypted data. The processing logic sends the encrypted data to the resource controller for storage in the system resource.

In one embodiment, the application is authenticated by sending an authentication request with an identifier of the application to the resource controller and receiving the first AARN and a second AARN from the resource controller responsive to the authentication request. The processing logic derives a second AK and a second AT and sends an access request, the second AK, and the second AT to the resource controller. The processing logic receives an access response from the resource controller responsive to the access request, wherein the access response comprises the data encrypted using the first EK. If the resource controller hashes first AK and verifies that a result of the hash equals the first AT, then second AARN and second AT are marked as valid; otherwise, if the result is not equal, the resource controller aborts the process.

In another embodiment, the processing logic receives an indication that the set of program instructions of the application at a memory location is to change due to an update in the set of program instructions or a runtime event. The memory location corresponds to at least one of the second set of memory addresses. The processing logic sends an update request to the resource controller, receives the first AARN, the first DARN, a second AARN, and a second DARN. The processing logic derives and stores the first AK using the first AARN and the first MK using the first DARN. After the memory location is changed, the processing logic generates a second AK using the second AARN and a second MK using the second DARN and stores the second AK and the second MK. The processing logic authenticates the application to the resource controller and receives data signed using the first MK responsive to the application being authenticated. The processing logic verifies the data signed using the first MK using the first EK to obtain unsigned data. The processing logic re-signs the unsigned data using the second MK to obtain signed data and sends the signed data to the resource controller for storage in the system resource.

Figure 9:
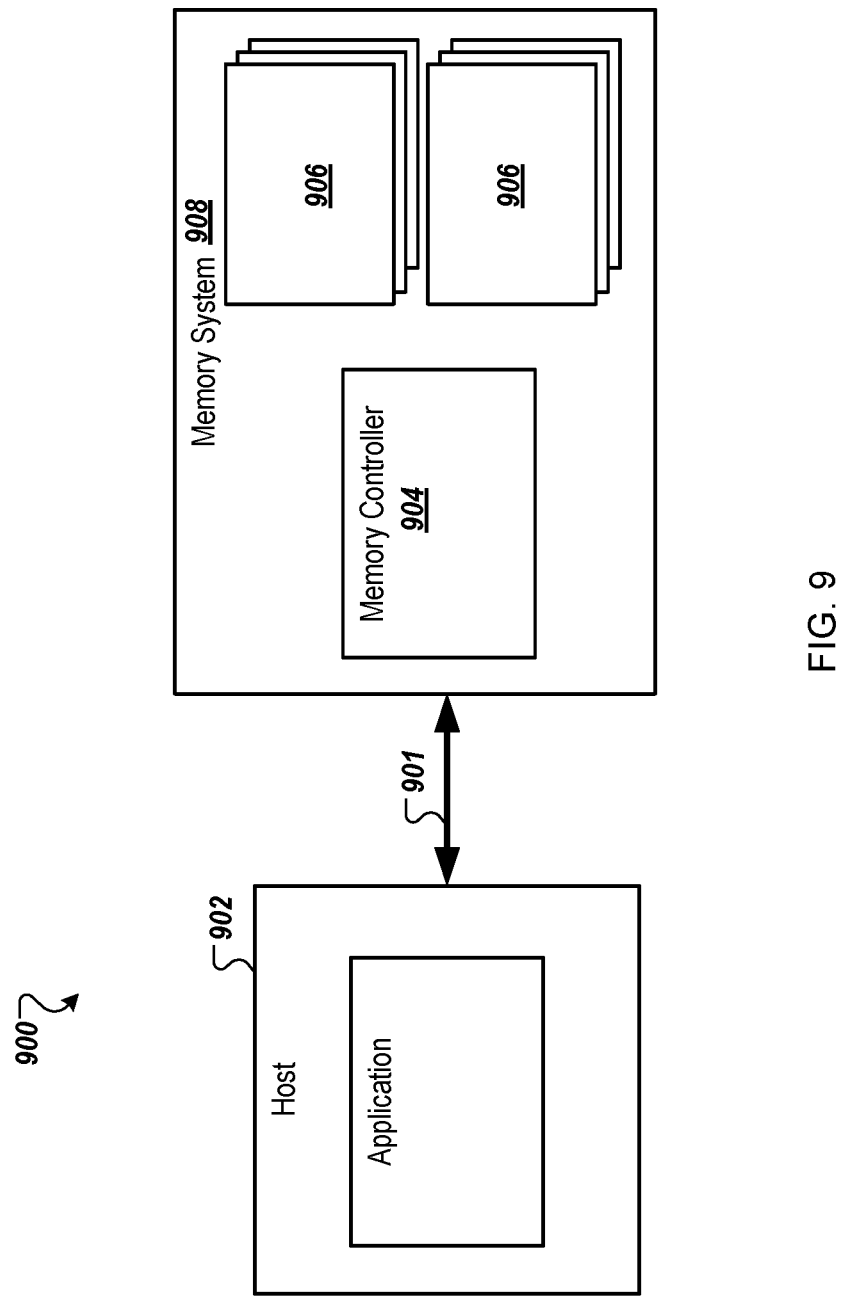
FIG. 9 is a block diagram of a computer system with an application that registers and authenticates with a memory controller for access to memory device(s) without storing pre-shared keys according to one embodiment.

FIG. 9 is a block diagram of a computer system 900 with an application 110 that registers and authenticates with a memory controller 904 (e.g., NVM controller) for access to memory device(s) 906 (e.g., NVM device(s)) without storing pre-shared keys according to one embodiment. The computer system 900 includes a host system 902 that includes one or more processors that execute the application 110. The host system 902 communicates with a memory system 908 over a host interface 901. The memory system 908 includes the memory controller 904 (e.g., NAND controller) and one or more memory devices 906. The memory controller 904 can be a NAND controller and the one or more memory devices 906 can be flash devices. The memory devices 906 can be organized in a memory array. Alternatively, other types of controllers and memory devices can be used.

During operation, the application 110 and the memory controller 904 can perform a registration process as described above with respect to method 400 of FIG. 4. The application 110 and memory controller 904 can perform an authentication process as described above with respect to method 500 of FIG. 5. The application 110 and memory controller 904 can perform an updated registration and authentication process as described above with respect to method 600 of FIG. 6.

The methods, systems, and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of integrated circuits, integrated circuit dies, interconnects, etc., described above with respect to FIGS. 1A-4C. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular implementations may vary from these exemplary details and still be contemplated to be within the scope of the present disclosure.

The description above includes specific terminology and drawing symbols to provide a thorough understanding of the present disclosure. In some instances, the terminology and symbols may imply specific details that are not required to practice the disclosure. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multiconductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology, or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "de-asserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or de-asserts, if explicitly stated or indicated by context) the signal on a signal line coupled between the signal driving and signal receiving circuits. A signal line is said to be "activated" when a signal is asserted on the signal line, and "deactivated" when the signal is de-asserted. Additionally, the prefix symbol "/" attached to signal names indicates that the signal is an active low signal (i.e., the asserted state is a logic low state). A line over a signal name (e.g. '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement. While the disclosure has been described with reference to specific embodiments thereof, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A resource controller comprising:
   a first interface to communicate with an application executing on a processor coupled to the resource controller;
   a second interface to communicate with a system resource; and
   a processing device coupled to the first interface and the second interface, wherein the processing device is to:
   receive an application identifier (ID) from the application;
   provide a current nonce to the application, wherein the current nonce is associated with the application ID;

receive a current key from the application, wherein the current key is generated by the application based on the current nonce and a set of program instructions of the application; and provide the application access to the system resource responsive to determining that a hash of the current key received from the application equals a current tag, wherein the current tag was previously provided from the application to the resource controller.

2. The resource controller of claim 1, wherein the current tag, provided from the application, was hashed using the current key by the application.

3. The resource controller of claim 1, further comprising a memory device coupled to the processing device, wherein the processing device is to store a table in the memory device, wherein the table comprises information for each application registered to the resource controller.

4. The resource controller of claim 1, further comprising a memory device coupled to the processing device, wherein the processing device is to:
store the application ID, the current nonce, and the current tag in the memory device;
mark the application ID, the current nonce, and the current tag as valid;
store the application ID and a new nonce; and
mark the application ID and the new nonce as invalid.

5. The resource controller of claim 1, further comprising a memory device coupled to the processing device, wherein the processing device is to:
store the application ID, the current nonce, the current tag, and a second nonce in the memory device, wherein the current nonce is an authentication nonce and the second nonce is an encryption nonce or a message authentication code (MAC) nonce;
mark the application ID, the current nonce, the current tag, and the second nonce as valid;
store the application ID, a new authentication nonce, and a third nonce, wherein the third nonce is a new encryption nonce or MAC nonce; and
mark the application ID, the new authentication nonce, and the third nonce as invalid.

6. The resource controller of claim 1, further comprising a memory device coupled to the processing device, wherein the processing device is to:
store the application ID, the current nonce, the current tag, a second nonce, and a third nonce in the memory device, wherein the current nonce is an authentication nonce, the second nonce is an encryption nonce, and the third nonce is a message authentication code (MAC) nonce; and
mark the application ID, the current nonce, the current tag, the second nonce, and the third nonce as valid.

7. The resource controller of claim 1, wherein the system resource is a non-volatile memory (NVM) device and the resource controller is an NVM controller.

8. The resource controller of claim 1, wherein the system resource is a cryptographic engine.

9. The resource controller of claim 1, wherein the system resource is a peripheral device.

10. A method comprising:
receiving, by a resource controller of a system resource, an application identifier (ID) from an application executing on a processor coupled to the resource controller;
providing, by the resource controller, a current nonce to the application, wherein the current nonce is associated with the application ID;

receiving, by the resource controller, a current key from the application, wherein the current key is generated by the application based on the current nonce and a set of program instructions of the application; and providing, by the resource controller, the application access to the system resource responsive to determining that a hash of the current key received from the application equals a current tag, wherein the current tag was previously provided from the application to the resource controller.

11. The method of claim 10, further comprising receiving, by the resource controller, the current tag from the application, wherein the current tag, received from the application, was hashed using the current key by the application.

12. The method of claim 10, further comprising:
receiving, by the resource controller, a registration request from the application, wherein the registration request comprises the application ID;
generating, by the resource controller, a first application authentication random nonce (AARN) in response to the registration request, wherein the first AARN is the current nonce;
sending, by the resource controller, the first AARN to the application, wherein the current key is a first authentication key (AK) generated by the application using values stored at a set of memory addresses in system memory based on the first AARN, wherein the set of memory addresses is associated with the set of program instructions of the application, wherein the current tag is a first authentication tag (AT) derived by the application cryptographically hashing the first AK;
receiving, by the resource controller, the application ID and the first AT from the application;
storing, by the resource controller in a table in memory of the resource controller, the application ID and the first AT; and
marking, by the resource controller, the application ID and the first AT stored in the table as valid.

13. The method of claim 12, further comprising:
receiving, by the resource controller, an authentication request with the application ID from the application;
verifying, by the resource controller, that the first AARN and first AT are marked as valid in the table;
generating, by the resource controller, a second AARN responsive to the authentication request;
storing, by the resource controller in the table, the second AARN;
marking, by the resource controller, the second AARN in the table as invalid;
sending, by the resource controller, the first AARN and the second AARN to the application responsive to the authentication request;
receiving, by the resource controller, an access request, the first AK, and a second AT from the application, wherein the second AT is derived by the application;
verifying, by the resource controller, that a result of hashing the first AK equals the first AT;
marking, by the resource controller the second AARN and the second AT in the table as valid responsive to the result being equal to the first AT; and
sending, by the resource controller, an access response to the application responsive to the access request, wherein the access response allows the application access to the system resource.

14. The method of claim 12, further comprising:
generating, by the resource controller, a first encryption random nonce (ERN);

sending, by the resource controller, the first ERN to the application in response to the registration request, wherein a first encryption key (EK) is generated by the application using values stored at a second set of memory addresses in system memory based on the first ERN, wherein the second set of memory addresses is associated with the set of program instructions of the application, wherein the current tag is a first authentication tag (AT) derived by the application cryptographically hashing the first AK; and receiving, by the resource controller from the application, encrypted data with an access request, the first AK, and a second AT, wherein the encrypted data is encrypted by the application using the first EK.

15. The method of claim 14, further comprising:
generating, by the resource controller, a first data authentication random nonce (DARN);
sending, by the resource controller, the first DARN to the application in response to the registration request, wherein a first message authentication code (MAC) key (MK) is generated by the application using values stored at a third set of memory addresses in system memory using the first DARN, wherein the third set of memory addresses is associated with the set of program instructions of the application; and
receiving, by the resource controller from the application, signed encrypted data with the access request, the first AK, and the second AT, wherein the signed encrypted data is encrypted by the application using the first EK and the encrypted data is signed by the application using the first MK.

16. The method of claim 12, further comprising:
generating, by the resource controller, a first data authentication random nonce (DARN);
sending, by the resource controller, the first DARN to the application in response to the registration request, wherein a first message authentication code (MAC) key (MK) is generated by the application using values stored at a second set of memory addresses in system memory using the first DARN, wherein the second set of memory addresses is associated with the set of program instructions of the application; and
receiving, by the resource controller from the application, signed data with an access request, the first AK, and the second AT, wherein the signed data is signed by the application using the first MK.

17. The method of claim 12, further comprising receiving, by the resource controller from the application, at least one of encrypted data, signed data or signed encrypted data, wherein the encrypted data is encrypted by a first encryption key (EK), wherein the signed data is signed by a first message authentication code (MAC) key (MK), and wherein the signed encrypted data is encrypted by the application using the first EK and signed by the application using the first MK, wherein the first AK, the first EK and the first MK are derived by the application using the first AARN, wherein the first AK, the first EK, and the first MK are cryptographically separated keys.

18. The method of claim 14, further comprising:
receiving, by the resource controller from the application, an update request responsive to the application receiving an indication that the set of program instructions of the application at a memory location is to change due to an update in the set of program instructions or a runtime event, wherein the memory location corresponds to at least one of the second set of memory addresses;
sending, by the resource controller, the first AARN, the first ERN, a second AARN, and a second ERN to the application;
after the memory location is changed, receiving an authentication request from the application with the application ID and a second AT;
sending, by the resource controller to the application, data encrypted using the first EK responsive to the application being authenticated; and
receiving, by the resource controller from the application, re-encrypted data for storage in the system resource, wherein the re-encrypted data is re-encrypted by the application using a second EK.

19. A computer system comprising:
a processor to execute an application;
a resource controller coupled to the processor; and
a system resource coupled to the resource controller, wherein the resource controller is to:
receive an application identifier (ID) from an application;
provide a current nonce to the application, wherein the current nonce is associated with the application ID;
receive a current key from the application, wherein the current key is generated by the application based on the current nonce and a set of program instructions of the application; and
provide the application access to the system resource responsive to determining that a hash of the current key received from the application equals a current tag, wherein the current tag was previously provided from the application to the resource controller.

20. The computer system of claim 19, wherein the current tag was hashed from the current key by the application.

* * * * *